July 11, 1939.  A. F. PASELK  2,165,810
SAFETY WHEEL
Filed Feb. 10, 1938  2 Sheets-Sheet 2
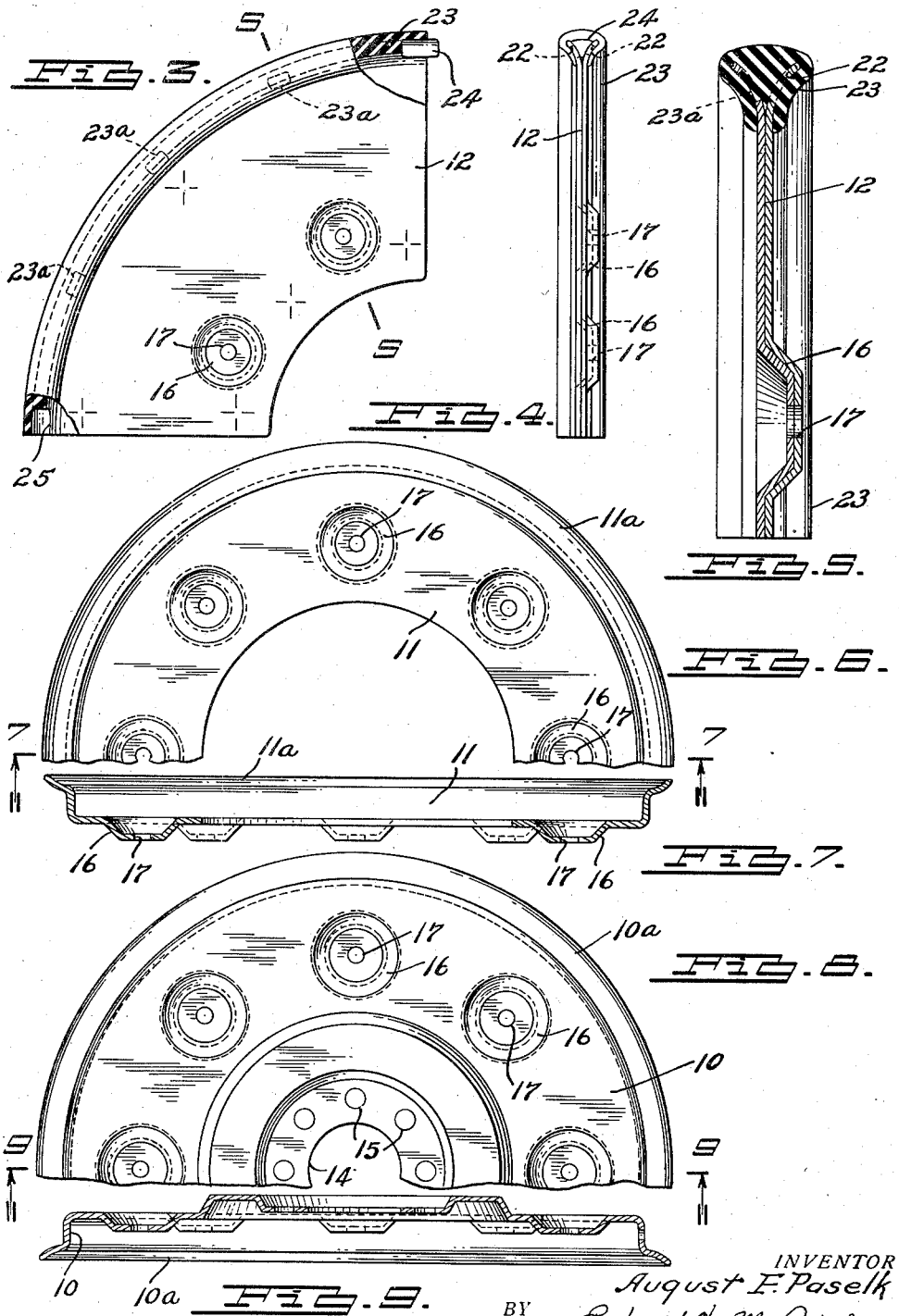
INVENTOR
August F. Paselk
BY Edward M. Apple
ATTORNEY Patented July 11, 1939

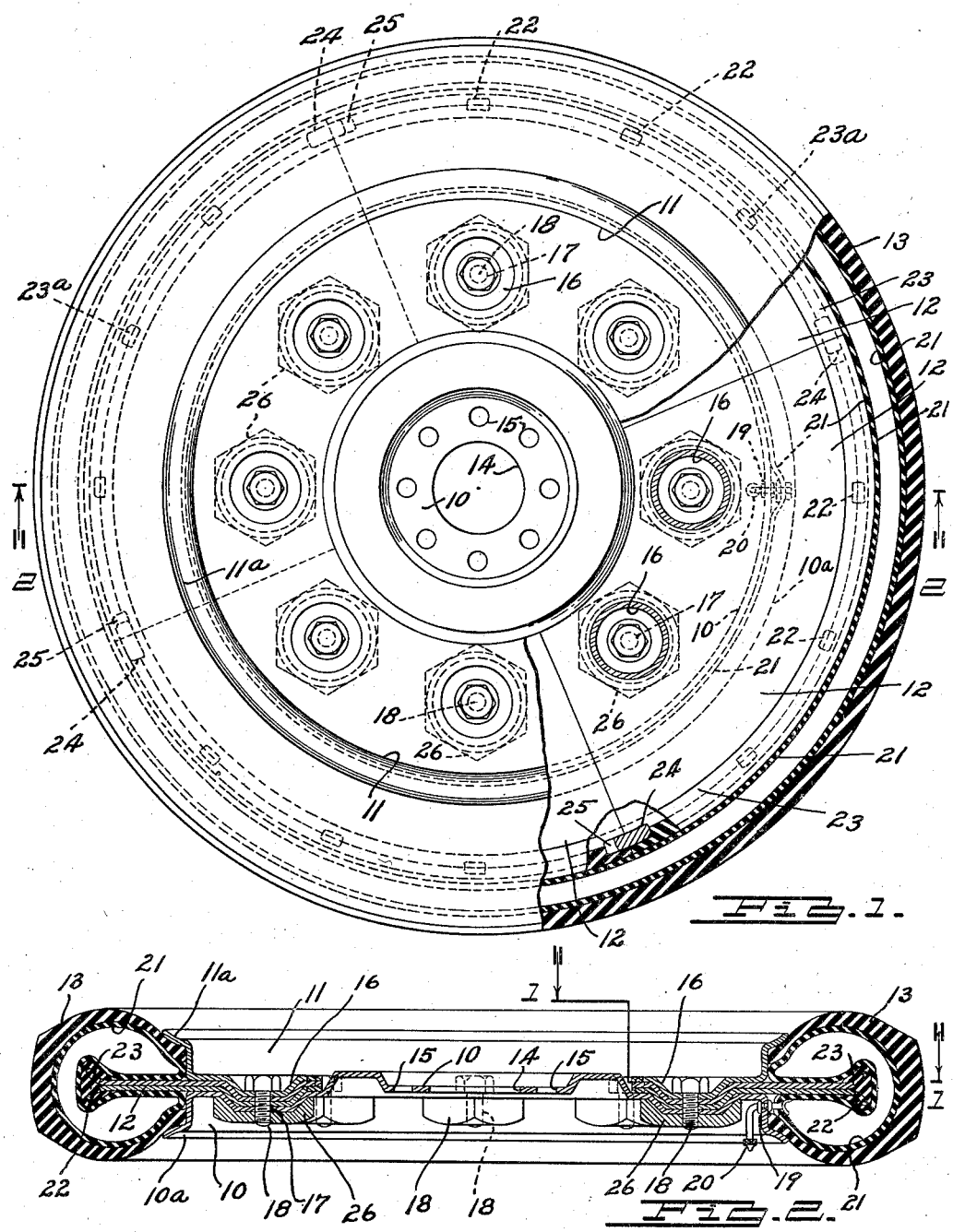

2,165,810

UNITED STATES PATENT OFFICE 2,165,810

SAFETY WHEEL

August F. Paselk, Detroit, Mich.

Application February 10, 1938, Serial No. 189,782

1 Claim. (Cl. 152—158)

This invention relates to vehicles and has particular reference to safety wheels for automotive vehicles employing pneumatic tires.

The sudden deflation of an automotive tire because of a blow-out or puncture when traveling at a high rate of speed has been the cause of many serious accidents. Considerable effort has been given to the problem of safeguarding the automobile and its passengers during such an eventuality, but much remains to be desired, in so far as the results are concerned.

It is an object of this invention to provide a device which will overcome many of the difficulties heretofore encountered in devices of this nature.

The principal object of the invention is the provision of a safety device which will adequately support the vehicle wheel and prevent the vehicle from swerving from its intended path in the event that a tire should suddenly blow out.

An advantageous feature of this invention resides in the fact that when in operation the safety load is carried by the device in a plane which intersects the wheel center, thereby stabilizing the vehicle by reducing the thrust caused by the lowering of one wheel.

Another feature of this invention resides in the fact that the safety device is carried within the tire which renders it invisible and protects it against the possibility of damage caused by stones or other obstructions in the road; and being so positioned the device will not prevent the wheels from traveling in a rutted road and will not gather mud, stones and other foreign substances, as is common with safety devices now on the market.

A further advantage of a safety device constructed and carried in the manner herein disclosed resides in the fact that if one section of the device should become damaged in any manner, that section can be replaced without discarding the whole device.

Further objects and advantages of the invention will appear as the description proceeds, reference being made from time to time to the accompanying drawings wherein:

Fig. 1 is a side elevation of a device embodying my invention with parts broken away to illustrate the construction and arrangement of the several elements.

Fig. 2 is a section taken on line 2—2 of Fig. 1.

Fig. 3 is a side elevation in detail, with parts broken away, of one of the rubber tired safety sectors adapted to extend from the wheel proper into the automobile tire.

Fig. 4 is an end view of the sector shown in Fig. 3.

Fig. 5 is a section taken on line 5—5 of Fig. 3.

Fig. 6 is a fragmentary side elevation of the flanged retaining ring which forms part of the wheel rim.

Fig. 7 is a section taken on line 7—7 of Fig. 6.

Fig. 8 is a fragmentary side elevation of the flanged disc which forms the principal part of the wheel structure.

Fig. 9 is a section taken on line 9—9 of Fig. 8.

Referring now more particularly to the drawings, it will be seen that in the embodiment herein disclosed (Figs. 1 and 2) my improved safety wheel consists generally of a disc wheel 10, a retainer ring 11 and the safety sectors 12 which are constructed and arranged as hereinafter described more particularly.

The disc wheel 10 and the ring 11 are flanged as at 10a and 11a, which flanges comprise the rim for retaining the tire casing 13 in position on the wheel. The disc 10 is provided with a central opening 14 to accommodate the vehicle axle, and with a plurality of holes 15 adapted to engage the stud bolts (not shown) carried on the brake housing by means of which the wheel is secured to the vehicle.

The disc 10, the ring 11 and the sectors 12, have matched bosses 16 and holes 17 adapted to accommodate bolts 18 by means of which they are secured together. The flange 10a is provided with an opening 19 to accommodate the valve stem 20 of the tire tube 21.

The safety sectors 12 are preferably made of two stampings spot welded together and flared at the outer peripheries as at 22, to form an anchor for the rubber 23, which forms an intermediate cushion or tire for the sectors when in use. Apertures 23a are formed in the flares 22 so that the rubber may extend therethrough to prevent slipping. The sectors 12 are further provided with dowels 24 arranged to engage corresponding recesses 25 in the adjacent sectors to provide means to lock the sectors in alignment. The number of sectors 12 which may be utilized in any wheel assembly depends upon the size of the pneumatic tire it is desired to use, as in assembling the wheel and tire the width of the sectors 12 must be less than the diameter of the central opening in the tire 13 so that the sectors 12 may be readily inserted into the tire 13.

I prefer to employ a special inner tube 21, the cross-section of which is substantially horseshoe shape, however, the construction of the tube forms no part of the within invention.

To assemble my improved safety wheel together with a tire, I prefer to place the disc wheel 10 on a bench or fixture, with the flange 10a disposed downwardly, as shown in Fig. 2. I then insert the inner tube 21 in the tire casing 13 and inflate the tube slightly. The casing 13 and tube 21 are then mounted on the wheel 10, so that the bead of the casing 13 engages the flange 10a of the wheel 10 and the valve stem 20 engages the valve opening 19 in the flange 10a. The safety sectors 12 are then inserted into the tube 21 and casing 13 and adjusted so that the dowels 24 of one sector engage the recesses 25 of an adjacent sector and the bolt holes 17 are in alignment with the bolt holes in the disc 10. The retaining ring 11 is then superimposed so that its bolt holes 15 are in alignment with those of the disc 10 and sectors 12. The bolts 18 are then inserted and the assembly is secured with the nuts 26 and the wheel is ready to be secured to the vehicle and the tire fully inflated. These operations are reversed to remove the wheel and tire.

Although I have herein disclosed the preferred form of my invention, it will be understood that certain modifications are possible in the construction and assembly, all of which are intended to be within the contemplation of the invention and the scope of the appended claim.

Having described my invention, what I claim and desire to secure by Letters Patent is:

A safety wheel comprising a main body portion, integral means on said body portion for engaging the bead of a tire, bosses on said body portion, an annular member having bosses arranged to engage the bosses of said body portion, said annular member having tire engaging means corresponding with the tire engaging means of said body portion, and a plurality of peripheral extension members detachably secured between said body and said annular member, each of said extension members consisting of two plates welded together, the outer periphery of each plate being flared to provide anchors for a resilient element.

AUGUST F. PASELK.